June 26, 1962  L. SCHWAB  3,040,497
ELECTROSTATIC GAS FILTERS
Filed Dec. 8, 1954  3 Sheets-Sheet 1

INVENTOR.
LOUIS SCHWAB
BY
ATTORNEY

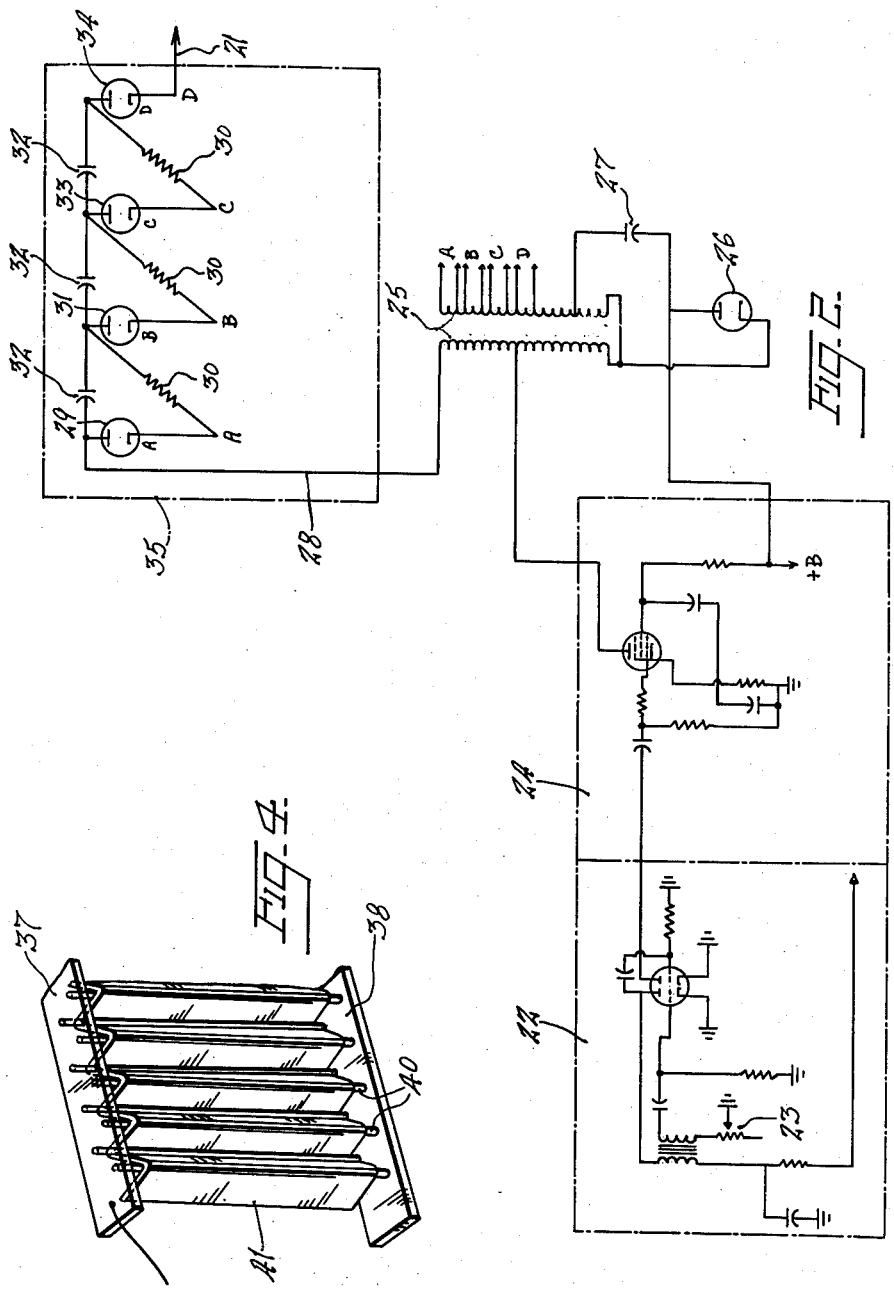

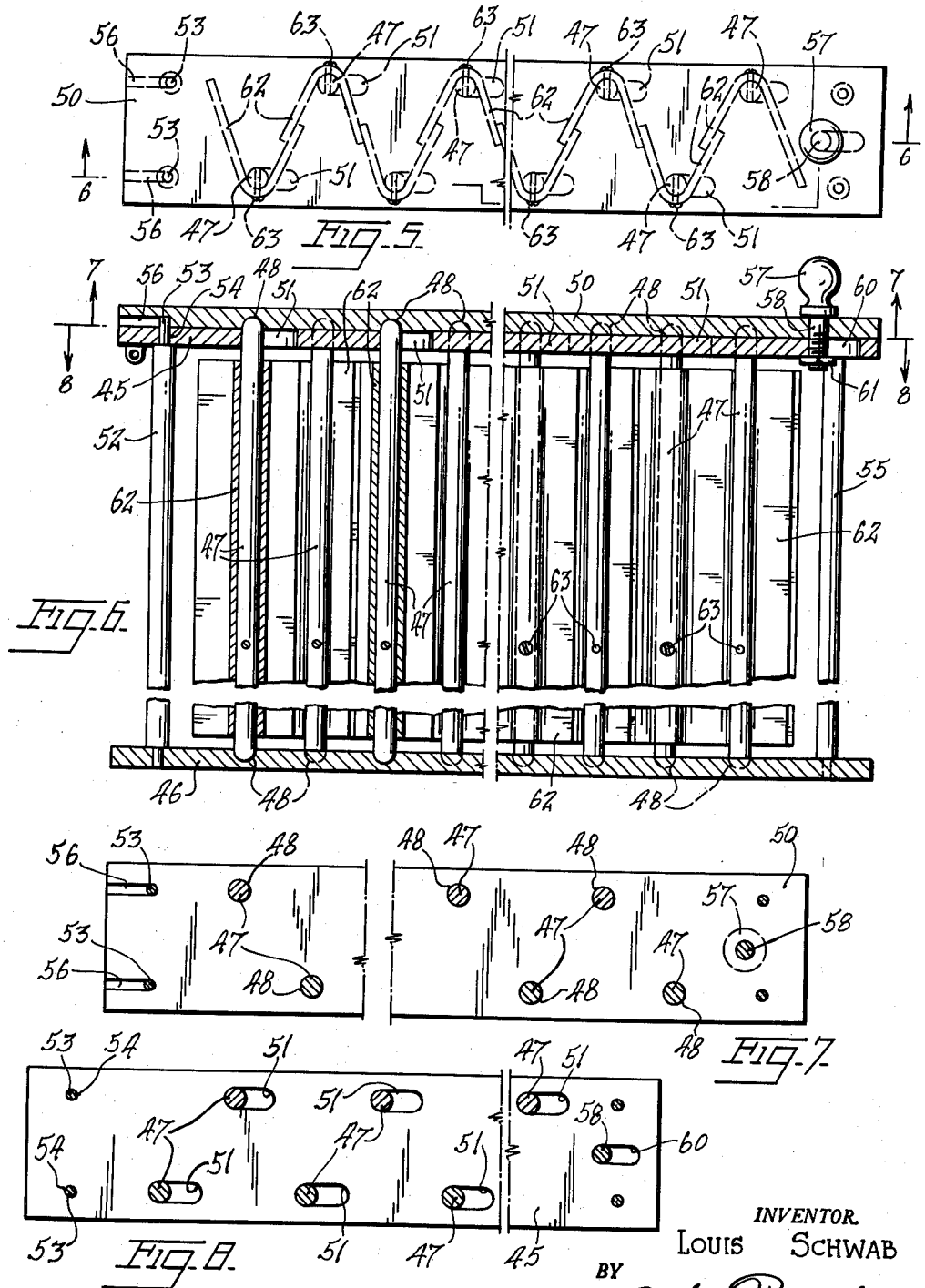

United States Patent Office 3,040,497
Patented June 26, 1962

3,040,497
ELECTROSTATIC GAS FILTERS
Louis Schwab, Massapequa Park, N.Y.
(1612A Plaza Road, Fair Lawn, N.J.)
Filed Dec. 8, 1954, Ser. No. 473,846
14 Claims. (Cl. 55—112)

This invention relates to new and useful improvements in electrostatic gas filters.

Electrostatic gas filters are known in which an electrostatic charge is applied to a glass floss or fiber filter to increase the effectiveness of the latter in filtering out particles of dust and the like from air passing through the filter.

It is the principal object of the invention to substantially increase the effectiveness of such filters. According to the invention a pair of filters of the sort mentioned are placed in close proximity to one another so that air passing through the one passes also through the other. A high voltage D.C. charge is applied to the one filter and a high frequency A.C. signal is applied to the other. The electrostatic charges produced by such electrostatic charging combine to create a completely charged space between the filters which greatly increases the effectiveness of filtration.

For further comprehension of the invention, and of the objects and advantages thereof, reference will be had to the following description and accompanying drawings, and to the appended claims in which the various novel features of the invention are more particularly set forth.

In the accompanyiyng drawings forming a material part of this disclosure:

FIG. 2 is a schematic wiring diagram of a means that provides a D.C. potential to the embodiment of the invention shown in FIG. 1.

FIG. 4 is a fragmentary isometric view of a modified form of filter which may be substituted for that shown in FIG. 1.

FIG. 5 is a plan view of a filter constructed in accordance with a modified form of the invention.

FIG. 6 is a sectional view taken on line 6—6 of FIG. 5 looking in the direction of the arrows.

FIG. 7 is a sectional view taken on line 7—7 of FIG. 6 looking in the direction of the arrows.

FIG. 8 is a sectional view taken on line 8—8 of FIG. 6 looking in the direction of the arrows.

Figure 1:
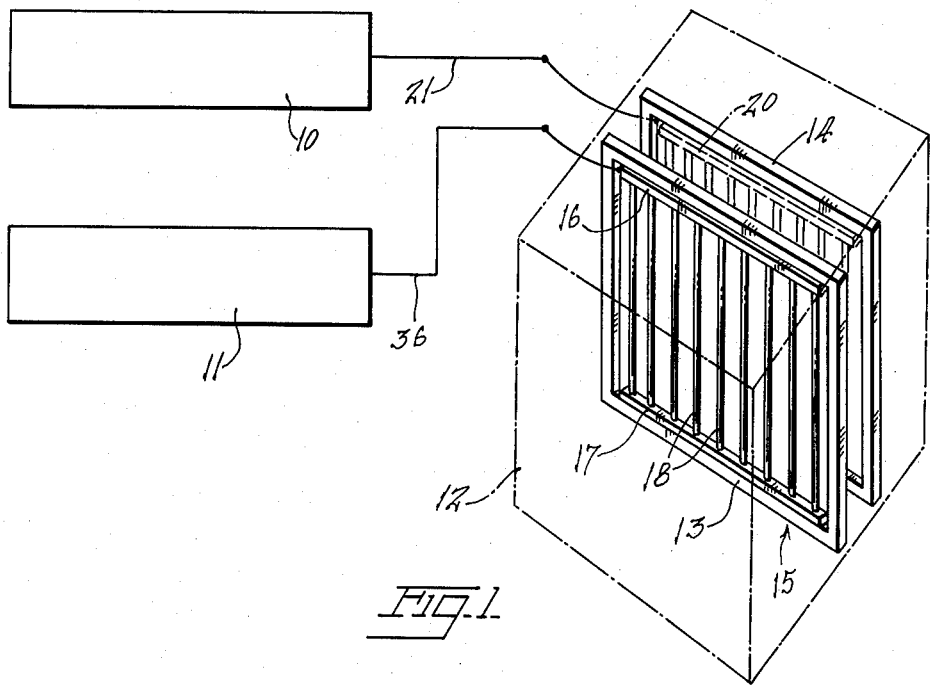
FIG. 1 is a partially diagrammatic and partially perspective view showing an embodiment of the invention.

Referring to FIG. 1, the device comprises a source of D.C. potential 10 in the form of a high frequency, high voltage pulse generator, and A.C. supply 11 and a filter unit 12. As shown the filter unit may comprise any suitable tunnel-like cabinet within which are mounted a pair of filters 13 and 14. Associated with the filter 13 is grid 15 which comprises upper and lower frame pieces 16 and 17 interconnected by vertical rods 18. The frame pieces 16 and 17 and the rods 18 are constructed of a conductive material. A second grid 20 identical with grid 15 is associated with the filter 14. Preferably the grids 15 and 20 are located on opposite sides of the filters 13 and 14 from one another. The filters 13 and 14 may be of any suitable commercially available type, for example, they may comprise a glass floss or fiber filter secured in a cardboard or other known non-conductive perimetral frame.

According to the invention the filters 13 and 14 and the associated grids 15 and 20 are mounted in the frame 12 in any suitable way so as to position the filters a short distance apart, say two inches, and to locate the grids immediately adjacent the associated filters. The mounting of the grids and filters must, however, be such as to insulate them above ground. This insulation must be of a sufficiently high quality to avoid its breaking down under high voltages.

According to the invention an extremely high voltage, D.C. pulsating charge is applied to the grid 20 for filter 14 by generator 10, the latter being connected to the grid by means of a suitably insulated conductor 21. Approximately 30,000 volts are applied to the grid 20. The generator 10 may comprise any suitable voltage means. For example, as shown in FIG. 2, the generator 10 may comprise a free running blocking oscillator 22 of familiar design adjusted via a potentiometer 23 to produce pulses of a desired frequency for application to a conventional power amplifier 24 which comprises a pentode of the type 6BG6. The plate of the pentode is connected to the center tap of the primary winding of transformer 25. One terminal of the transformer primary is connected to a terminal of its secondary and to the cathode of a rectifier 26. The plate of the rectifier is connected to a source of B+ potential and also, through an A.C. coupling condenser 27 to a tap of the secondary of the transformer to boost the potential applied to the said terminal of the transformer primary, and the other terminal of the transformer primary is connected via a lead 28 to the plate of a high voltage rectifier 29 of the type 1B3 whose cathode is connected to taps on the transformer secondary as indicated by the letters A. The cathode of rectifier 29 is also connected via a large resistor 30 to the anode of a second rectifier 31 whose anode is coupled to that of rectifier 29 by a condenser 32.

The cathode of rectifier 31 is connected to taps on the secondary of transformer 25 as indicated at B. Third and fourth rectifiers 33 and 34 identical with the rectifiers 29 and 31, being interconnected by a resistor 30 and a condenser 32 as described above, and the former, rectifier 33, being connected to rectifier 31 by a said resistor and condenser. The cathodes of rectifiers 33 and 34 are also connected to taps on the transformer secondary as indicated at C and D. The output line 21 for the rectifier circuit which may conveniently be referred to as a voltage multiplier 35, is extended from the cathode of rectifier 34.

The circuit arrangement is such that the high frequency pulses produced by blocking oscillator 22 are amplified by amplifier 24 which drives transformer 25. Rectifier 26 effects half wave rectification of the voltage swings of transformer 25, the positive swings being boosted by the coupling through condenser 27, and large positively directed voltage pulses are applied to the voltage multiplier 35. Multiplier 35 greatly increases the magnitude of these pulses so that approximately 30,000 volts D.C. are applied to the output line 21.

Figure 3:
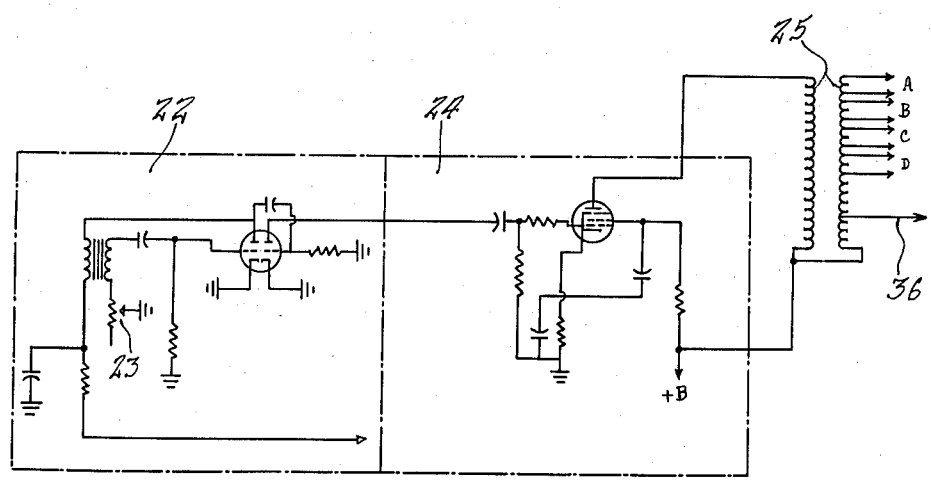
FIG. 3 is a schematic wiring diagram of a means that provides a high frequency signal to the embodiment of the invention shown in FIG. 1.

Referring now to FIG. 3, the high frequency A.C. supply 11 may comprise a free running blocking oscillator 22, a power amplifier 24 and a transformer 25 identical with those described above. However the output of the amplifier is connected to the opposite terminal of the primary winding to that which is connected to B+, the rectifier 26 is eliminated and the output line 36 of the circuit is extended from a tap of the secondary of the transformer as shown.

The circuit arrangement is such that the pulses produced by blocking oscillator 22 and amplified by amplifier 24 drive transformer 25 to produce a high frequency A.C. signal for application to output line 36.

The output lines 21 and 36 are connected to the grids 20 and 15, respectively. Thus the high voltage D.C. is applied to grid 20 while the high frequency A.C. signal is applied to grid 15. Such charging create different electrostatic charges surrounding the grids and embracing the filters 13 and 14. The electrostatic charges combine in the area between the filters to form a dense electrostatic barrier to dust particles and the like which greatly increases the effectiveness of filtration of the unit.

Referring now to FIG. 4 there is illustrated a modified form of filter which may be substituted for either or both of the filters 13 and 14. As shown, the filter comprises upper and lower conductive frame members 37 and 38 interconnected by conductive rods 40 of which alternate ones are offset laterally to provide a staggered array. A sheet 41 of fiber or glass floss filtering material is threaded through the staggered rods so that alternate ones thereof are located on opposite sides of the sheet and the latter presents a pleated appearance.

The modified filter proves somewhat more efficient than the flat variety described hereinabove in that the electrostatic charge surrounding each of the rods 40 combines with those of the other rods to produce a deeper charged area through which air passing through the filter must negotiate.

It is to be understood that instead of two filters 13 and 14 a single filter may also be used.

Referring now to FIGS. 5–8 there is disclosed a modified filter construction which facilitates the removal of dust and other particles arrested by the filter. As shown the filter comprises upper and lower conductive frame members 45 and 46 interconnected by conductive rods 47 of which alternate ones are offset laterally to provide a staggered array. The rods 47 are provided with rounded ends for engagement in hemispherical depressions 48 in the lower frame member 46 and in a frame member 50 slidably mounted on upper frame member 45. The rods pass through longitudinally extended slots 51 in frame member 45.

Upper and lower frame members 45 and 46 are secured together at their one ends by corner posts 52 having reduced ends 53 fixed in holes 54 in the frame members. At their other ends, the frame members 45 and 46 are secured together by similar posts having reduced ends fixed in holes in the frame members. The reduced upper ends 53 of the posts 52 project above the frame member 45 in longitudinal grooves 56 in the underface of frame member 50.

In order to move frame piece 50 longitudinally relative to frame member 45, a knob 57 is secured atop the former near the end opposite the grooves 56. Knob 57 is provided with a threaded shank 58 which extends through a hole in frame piece 50 and a longitudinal slot 60 in frame member 45 and has a nut 61 threaded thereon.

Secured to the rods 47 and extending in opposite directions with their edges overlapping are relatively stiff V-shaped fiber or other filters 62. Preferably the filters are secured to the rods 47 by headed screws 63.

The construction is such that the rods 47 and the filters 62 secured thereto may be tilted back and forth to shake dust and the like from the filters. It is assumed, of course, that this cleaning operation is performed when the electrical charge is removed therefrom. The frame members 45 and 46 may be secured in any suitable housing and insulated above ground in any suitable way. These features form no part of the present invention and thus, are not illustrated or described.

While I have illustrated and described the preferred embodiments of my invention, it is to be understood that I do not limit myself to the precise constructions herein disclosed and that various changes and modifications may be made within the scope of the invention as defined in the appended claims.

Having thus described my invention, what I claim as new, and desire to secure by United States Letters Patent is:

1. An electrostatic gas filter comprising a pair of air filters located in close proximity to one another in position for air to be filtered to pass through both, means for applying a high voltage D.C. charge to one filter and means for applying a high frequency alternating current to the other filter.

2. An electrostatic gas filter comprising a first air filter mat, means for producing a high D.C. voltage to apply an electrostatic charge to said mat, a second air filter mat, and means for producing a high frequency, alternating current to apply pulsatingly an electrostatic charge to said second mat, said mats being positioned in close association for air passing through one to pass through the other.

3. An electrostatic gas filter comprising a first air filter mat, means for producing a high D.C. voltage to apply an electrostatic charge to said mat, a second air filter mat, and means for producing a high frequency, alternating current to apply pulsatingly an electrostatic charge to said second mat, said mats being positioned in close association for air passing through one to pass through the other, the electrostatic charges of the two mats combining to produce a dense charge between the mats to more completely filter air passing through the mats.

4. The combination according to claim 3 and including a conductive grid located adjacent each said mat and to which said D.C. voltage and alternating current are applied to create said charges.

5. The combination according to claim 4 wherein each said grid comprises upper and lower conductive frame pieces and a plurality of conductive rods interconnecting them.

6. The combination according to claim 5 wherein the mats and the grids are insulated above ground.

7. The combination according to claim 6 wherein the means for producing the D.C. voltage comprises a blocking oscillator, a power amplifier for amplifying the output of the blocking oscillator, an output transformer having primary and secondary windings, said amplifier being center tap connected to the primary winding, a source of D.C. voltage, a half wave rectifier connecting said source to a terminal of the primary, said terminal being directly coupled to a terminal of the secondary, a plurality of taps dividing the secondary into a plurality of sections each producing a step-up action of voltages applied to the primary, and a voltage multiplier controlled by said secondary sections and the other terminal of the primary.

8. The combination according to claim 7 wherein the means for producing the alternating current comprises a blocking oscillator, an amplifier driven by the oscillator and a step-up transformer driven by the amplifier.

9. An electrostatic gas filter comprising means for producing a high D.C. voltage, means for producing a high frequency alternating current and a pair of filter means to which said D.C. voltage and alternating current, respectively are applied to surround the same with electrostatic charges, each said means comprising a conductive grid to which said D.C. voltage and alternating current, respectively is applied, said grids comprising upper and lower frame members, a shiftable member slidably mounted on the upper member, said upper member being provided with longitudinal slots and the lower and the shiftable members being provided with hemispherical depressions aligned with the slots, alternate depressions and slots being offset laterally, a plurality of rods having rounded ends engaged in said depressions, said rods passing through said slots, and V-shaped filters secured on said rods and extending in opposite directions with their ends overlapping.

10. The combination according to claim 9 and including corner posts securing the upper and lower frame members together, the posts at one end of the members being provided with reduced upper ends extending through the upper member, the shiftable member being provided with longitudinal grooves engaged by said reduced ends, and a knob secured to said shiftable member and having a shank extending through the member, said upper member having a longitudinal slot engaged by said shank.

11. The combination according to claim 10 wherein the grid is insulated above ground.

12. The combination according to claim 11 wherein the means for producing the D.C. voltage comprises a blocking oscillator, a power amplifier for amplifying the output of the blocking oscillator, an output transformer having primary and secondary windings, said amplifier being center tap connected to the primary winding, a source of D.C. voltage, a half wave rectifier connecting said source to a terminal of the primary, said terminal being directly coupled to a terminal of the secondary, a plurality of taps dividing the secondary into a plurality of sections each producing a step-up action of voltages applied to the primary, and a voltage multiplier controlled by said secondary sections and the other terminal of the primary.

13. The combination according to claim 12 wherein the means for producing the alternating current comprises a blocking oscillator, an amplifier driven by the oscillator and a step-up transformer driven by the amplifier.

14. An electrostatic gas filter comprising means for producing a high D.C. voltage, means for producing a high frequency alternating current and a pair of filter means to which said D.C. voltage and alternating current are applied to surround the same with electrostatic charges, each said filter means being movable to shake loose dust collected thereon.

References Cited in the file of this patent

UNITED STATES PATENTS

| | | |
|---|---|---|
| 2,086,063 | Brion et al. | July 6, 1937 |
| 2,297,601 | Williams | Sept. 29, 1942 |

FOREIGN PATENTS

| | | |
|---|---|---|
| 393,692 | Germany | Apr. 16, 1924 |

OTHER REFERENCES

Problems in Smoke, Fume, and Dust Abatement, F. G. Cottrell, page 666, from the Smithsonian Report for 1913, Washington Government Printing Office.